Aug. 16, 1927.

J. ZUBATY 1,638,904

BRAKE

Filed Nov. 1, 1923

Inventor

Joseph Zubaty

Patented Aug. 16, 1927.

1,638,904

UNITED STATES PATENT OFFICE.

JOSEPH ZUBATY, OF FLINT, MICHIGAN.

BRAKE.

Application filed November 1, 1923. Serial No. 672,192.

This invention relates to brakes, and is illustrated as embodied in a brake for the front wheel of an automobile.

An object of the invention is to provide a brake of this character which is not affected by steering movement of the wheel and which is yet comparatively simple in its construction and adjustment.

Having this object in mind, the invention contemplates the use of brake operating connections including parts carried respectively by the knuckle and by the axle or an equivalent part which does not turn with the knuckle, and which engage each other in a novel manner substantially in the axis about which the knuckle swivels,—that is, in the steering axis of the wheel. In one desirable arrangement, a driver-controlled member engages in the manner described a plunger supported on the knuckle and arranged to operate an expansible and contractible brake band to bring it into frictional engagement with a drum carried by the wheel. In the arrangement shown in the drawings, and which is especially advantageous in that it eliminates any necessity for extremely close machining and adjustment of the various parts, the driver-controlled member and the plunger or other brake operating member have cooperating semi-spherical surfaces slidably engaging each other substantially in the steering axis.

The above and other objects and features of the invention, including various novel combinations of parts and desirable particular constructions, will be apparent from the following description of one illustrative embodiment shown in the accompanying drawings, in which Fig. 1 is a vertical section substantially on the line 1—1 of Fig. 2 showing partly in section and partly in rear elevation the parts of the right hand front wheel and its associated brake;

Figures 1, 2, 3:
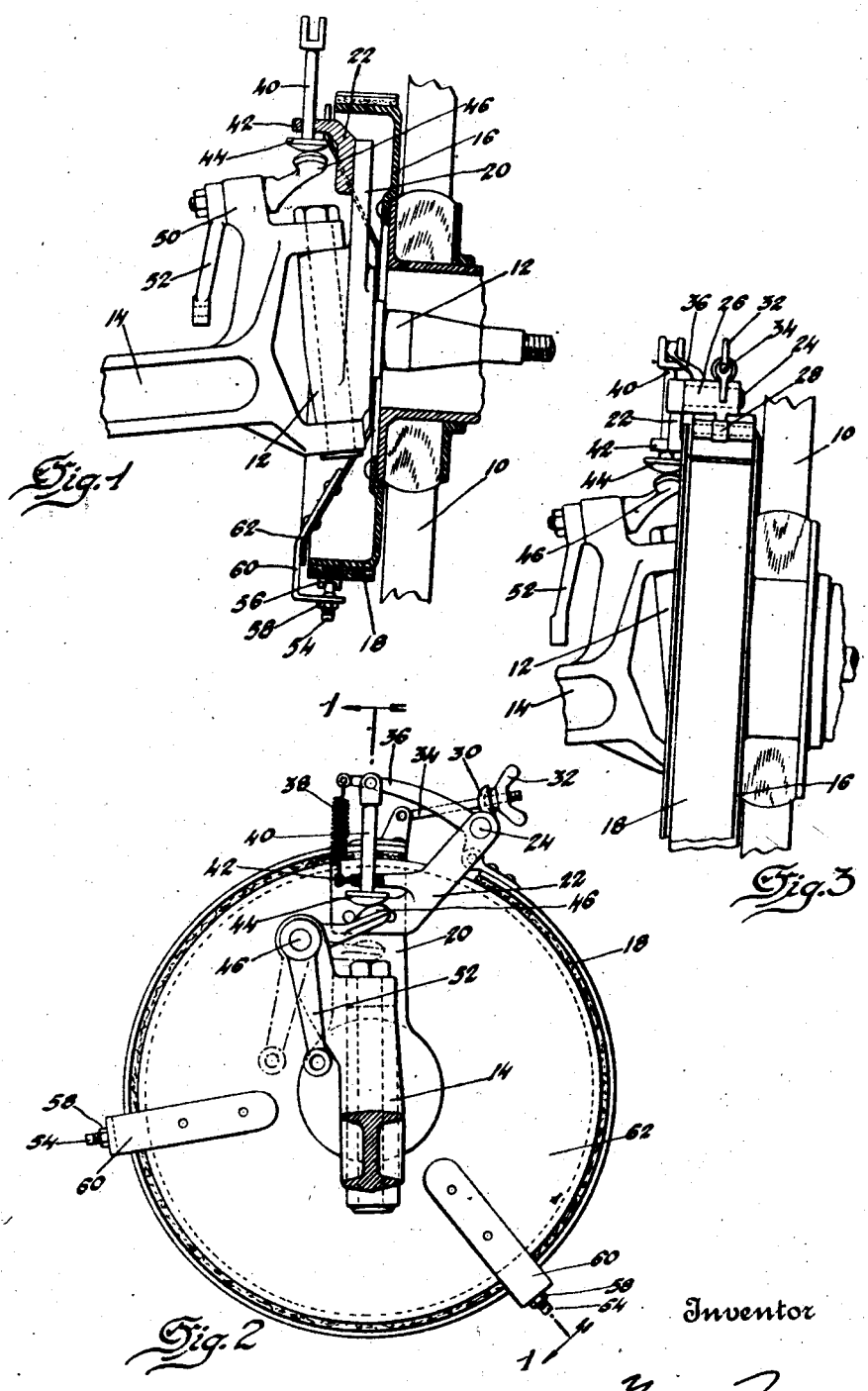
Fig. 2 is a side elevation looking from the left in Fig. 1.
Fig. 3 is a rear elevation of the wheel and its brake.

In the arrangement selected for illustration, my improved brake is shown as controlling a wheel 10 journaled on a knuckle 12 having a portion received between upper and lower arms of a front axle 14 and swiveled to the said arms to turn about a substantially vertical steering axis. In the particular arrangement shown in the drawings, the axis is inclined slightly to provide what is known as "center point steering". The wheel 10 carries a brake drum 16 and the knuckle 12 supports an expansible and contractible band 18 arranged to be moved into frictional engagement with the drum to retard the motion of the wheel. The above listed parts, except as further described below, may be of any desired construction.

According to the present invention, the knuckle 12 has an upwardly extending arm 20, and a supporting bracket 22 is either formed integrally with this arm or is secured thereto in any desired manner. At its upper end, the bracket supports a bearing member 24 on which is sleeved for support a three-arm lever 26 having a lower arm 28 directly pivotally connected to one end of the band 18. The lever 26 also has an upwardly extending arm 30 having a semi-spherical socket to receive a plano-convex washer held by a wing nut 32 threaded on a link 34 pivotally connected to the opposite end of the band 18. The lever 26 also has a forwardly and laterally extending arm 36 arranged, as will be apparent from a comparison of Figs. 2 and 3, substantially to intersect the axis about which the knuckle 12 swivels, and which is normally held yieldingly in idle position by a return spring 38 connecting it to a lug on the bracket 22.

A plunger 40 is pivotally connected at its upper end to the arm 36 substantially in the steering axis and is slidably guided along this axis by a perforated lug 42 formed on the bracket 22. At its lower end, the plunger 40 is formed with a head 44 having a semi-spherical surface slidably engaging a similar surface formed on the end of a rock lever 46 secured to a shaft 48 supported in an upwardly extending lug 50 of the axle 14 and arranged to be operated by an arm 52 connected by suitable links or cables to operating devices controlled by the brake pedal or its equivalent.

The band 18 is held against lateral movement, and is guided in its movement toward and from the band, by a pair of anchors including threaded stems 54 pivoted to lugs 56 secured to the band and on which are threaded nuts 58 having conical or semi-spherical base surfaces received in openings formed in brackets 60 secured to or integral with a dished plate 62 carried by the knuckle 12 and arranged to close the open side of the drum 16. If the resilience of the brake band is in any particular case not sufficient to return it to an idle position where it does not drag against the drum, these anchors may be provided with return springs in the usual manner.

In operation, the depression of the brake pedal, or operation of any equivalent controlling member, rocks the arm 52 to move the plunger 40 upwardly against the resistance of the spring 38 to turn the three-arm lever 26 in a clockwise direction, thus tightening the band 18 against the drum. The torque is transmitted to the knuckle principally through the anchors 54, but partly also through the brake operating connections. It will be seen that one great advantage of the described arrangement is that it is not necessary to secure extremely accurate machining of the various parts or to adjust them with extreme accuracy, inasmuch as the slidably engaging semi-spherical surfaces can move with respect to each other, and there is therefore no change in the braking action if the point of engagement of these surfaces does not move exactly along the steering axis. In fact, when an inclined steering axis is used as shown in the drawings, I find it is more convenient to mount the plunger 40 in a practically vertical position, although its position is then not exactly coincident with the steering axis. The point of engagement between the arm 46 and the head 44 changes slightly as the brake is applied, and if the parts are not designed and machined with the utmost accuracy, it will usually also change slightly when the knuckles are turned in steering the vehicle. However, by the novel described arrangement, this slight change has no effect on the brake.

While one illustrative embodiment of the invention has been described in detail, it is not my intention to limit its scope to that embodiment or otherwise than by the terms of the appended claims.

The term "front wheel" is intended as a convenient generic designation of any dirigible wheel, and the term "band" is intended as a convenient generic designation including all the usual forms of retarding members.

I claim:

1. A front wheel brake comprising, in combination, a front axle having a steering knuckle swiveled thereto, a wheel journaled on the knuckle having a brake drum, an expansible and contractible band supported by the knuckle in position to engage the exterior of the drum, and means for operating the band including a plunger supported by the knuckle and a lever supported by the axle having convex generally spherical surfaces slidably engaging each other substantially in the axis about which the knuckle swivels.

2. A front wheel brake comprising, in combination, an axle having a steering knuckle swiveled thereto, a wheel journaled on the knuckle having a brake drum, an expansible and contractible band supported by the knuckle in position to engage the drum, brake operating means carried by the knuckle and including a plunger above the knuckle sliding in the general direction of the axis about which the knuckle swivels, and a disconnected operating device carried by the axle and engaging the plunger substantially in said axis.

3. A front wheel brake comprising, in combination, an axle having a steering knuckle swiveled thereto, a wheel journaled on the knuckle having a brake drum, an expansible and contractible band supported by the knuckle in position to engage the exterior of the drum, toggle members connecting the ends of the band, a vertically sliding plunger on the knuckle having a head and arranged to operate the toggle members, and a lever on the axle having at one end a surface slidably engaging the head of the plunger in the axis about which the knuckle swivels and operable to move the plunger to apply the brake.

4. A front wheel brake comprising in combination, an axle having a knuckle swiveled thereto, a wheel journaled on the knuckle having a brake drum, a band surrounding the drum, band contracting connections between the ends of the band and including a rock arm extending above the axis about which the knuckle swivels, a sliding plunger substantially in said axis and connected to the arm, a driver controlled rock member disconnected from the plunger and arranged to engage the plunger slidably to move it along the axis about which the knuckle swivels to apply the brake regardless of the angular position of the knuckle.

5. A front wheel brake comprising, in combination, an axle having a knuckle swiveled thereto, a wheel journaled on the knuckle, a brake including parts mounted respectively on the wheel and the knuckle, those parts mounted on the knuckle including a lever adapted to draw together the ends of a brake band and having an arm, a plunger secured at one end to said arm and having its other end provided with a convex surface, and a lever carried by the axle, said lever having a convex surface adapted to press against the convex end of the plunger.

In testimony whereof I affix my signature.

JOSEPH ZUBATY.